Dec. 19, 1933.  B. DICK  1,939,959
PISTON WRIST PIN RETAINER
Filed Sept. 6, 1932
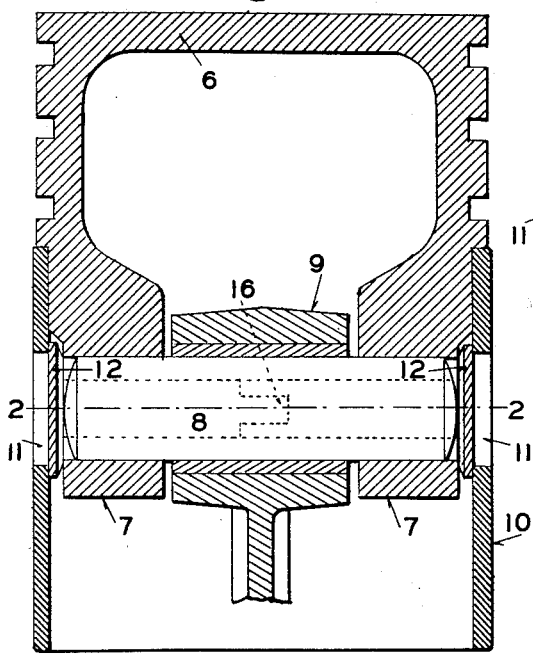
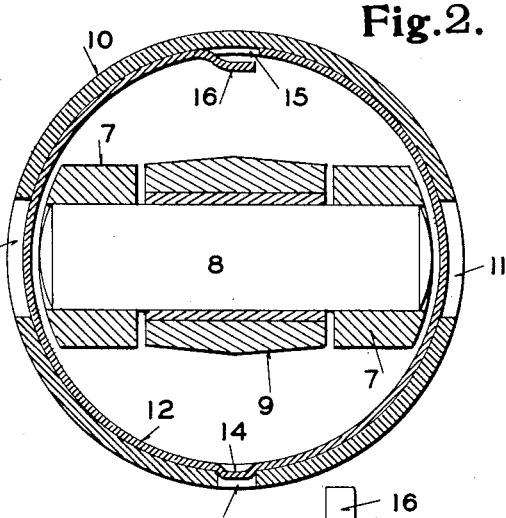
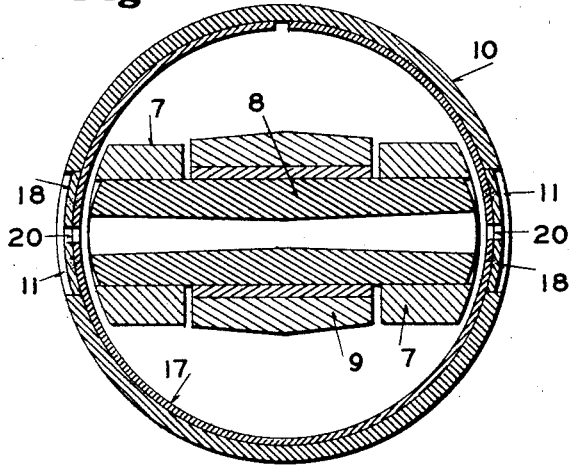
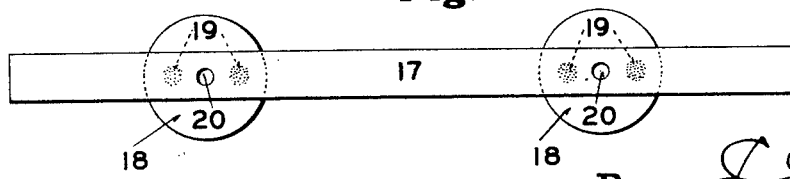
Inventor
BURNS DICK
By
Att'y.

Patented Dec. 19, 1933

1,939,959

UNITED STATES PATENT OFFICE 1,939,959

PISTON WRIST PIN RETAINER

Burns Dick, Ferguson, Mo., assignor to Wagner Electric Corporation, St. Louis, Mo., a corporation of Delaware Application September 6, 1932. Serial No. 631,872

3 Claims. (Cl. 309—19)

My invention relates to wrist pin retainers for pistons and particularly for the type of piston used in internal combustion engines and the like in which the wrist pin bearing is surrounded by, but spaced apart from, an extension known as a skirt which is either formed integral with or attached to the piston head. The skirt is provided with openings to permit the insertion of the wrist pin into the bearing and its removal therefrom. Heretofore great difficulty has been encountered in providing simple and effective means for limiting the endwise movement of the pin so that it cannot project through one of the openings in the skirt and come in contact with the wall of the cylinder with resultant scarring of the wall of the latter.

While this difficulty is met in various types of pistons, it is more pronounced in composite pistons having a head of light metal, such as aluminum, and an attached steel shell forming the skirt. Therefore, while I have illustrated my retainer as applied to this type of piston, I wish it to be understood that my invention is not limited to this kind of piston but is applicable to other types, both unitary and composite.

In the accompanying drawing, which illustrates two embodiments of my invention, Figure 1 is a longitudinal section of one form; Figure 2 is a cross section taken on the line 2—2 of Figure 1; Figure 3 is a developed view of the retaining ring shown in Figures 1 and 2; Figure 4 is a view similar to Figure 3, but showing a modification; and Figure 5 is a development of the retaining ring shown in Figure 4.

Referring first to Figures 1 to 3, 6 indicates the head of the piston which is made of light metal, such as aluminum. Formed integral with the head are a pair of depending bosses 7 which form the bearing for the wrist pin 8 by means of which the piston is pivotally attached to the connecting rod 9. Secured to the head, in any suitable manner, is a steel shell 10 forming the skirt of the piston. A pair of pin openings 11 are formed in the skirt opposite the ends of the pin to permit its insertion into and removal from the bearings. The bosses are spaced from the skirt so as to provide room for the reception of a pin retaining ring, now to be described.

The retaining ring is formed from a strip of resilient sheet metal of the shape shown in Figure 3. This strip is rolled or otherwise shaped to for a ring 12, the normal diameter of which is somewhat greater than the internal diameter of the skirt so that when the ring is sprung into position, as shown in Figures 1 and 2, the resiliency of the ring will cause it to expand against the inner wall of the skirt and remain in firm contact therewith, thus avoiding rattle or chatter due to the movement of the piston. The frictional contact between the skirt and the ring may, however, prove insufficient to prevent relative movement of the parts due to the rapid reciprocation of the piston and it is, therefore, desirable to provide positive locking means to prevent such movement. One simple and effective means for locking the parts together consists in providing either the skirt or the ring with one or more recesses and the other part with a corresponding projection or projections engaging therewith. In the drawing I have shown the skirt as provided with a recess formed by boring or punching a hole 13 therein and the projection 14 as formed by striking up a portion of the metal of the ring to cooperate therewith (as shown in Figure 2). One end of the strip may be provided with a slot 15 and the other with an interlocking tongue 16, and the end of the latter may be bent inwardly to provide tool engaging means to assist in the removal of the ring.

In Figures 4 and 5, I have shown a modification in which the retaining member is formed of a strip of resilient metal 17 to which are attached a pair of discs 18 adapted to enter the pin holes 11 in the skirt. The thickness of these discs is somewhat less than that of the material of the skirt so that they will not come in contact with the walls of the cylinder. The discs may be secured to the strip 17 by means of spot welding 19. Holes 20 may be formed in the discs and the strip for the passage of oil fed through a hollow wrist pin. The strip 17, like the strip 12, heretofore described, is made of spring material and formed into a ring of such size as to be sprung into position against the inner wall of the skirt. In this construction, however, no additional locking means is necessary as the engagement of the discs 18 with the pin openings 11 effectively prevents relative movement between the skirt and the ring.

With my construction the wrist pin may float in the connecting rod bearing or in the piston bearing, or in both, as in any case the retaining ring will effectively limit the endwise movement of the pin in either direction and so prevent its contact with the cylinder wall. Furthermore, the retaining ring does not add materially to the weight of the piston nor throw it out of balance. It is easily applied and removed and is not liable to work loose and so cause noisy operation of the engine.

Having fully described my invention, what I claim as new and desire to secure by Letters Patent of the United States is:

1. The combination with a piston comprising a wrist pin bearing and a surrounding skirt spaced from the bearing, said skirt being provided with an opening for the insertion and removal of a wrist pin, of a spring retaining ring positioned between the bearing and the skirt, and a member carried by said ring and engaging with the pin opening in the skirt.

2. The combination with a piston comprising a skirt and a pair of bosses forming a wrist pin bearing located within said skirt, said bearing being spaced from the skirt, of a resilient ring surrounding said bosses and positioned in the space between the bosses and the skirt, said ring being biased to expand, whereby the ring and the skirt are held in contact, said skirt being provided with openings for the insertion and removal of a wrist pin, and members carried on the ring and entering the pin openings in the skirt.

3. The combination with a piston, comprising a wrist pin bearing and a surrounding skirt spaced from the bearing, said skirt being provided with an opening for the insertion and removal of a wrist pin, of a spring retainer positioned between the bearing and the skirt, and a member carried by said retainer and engaging with the pin opening in the skirt.

BURNS DICK.